(12) United States Patent
Kikuchi

(10) Patent No.: US 7,681,120 B2
(45) Date of Patent: Mar. 16, 2010

(54) DOCUMENT SERVER GENERATING LINK INFORMATION FOR CREATING A CORRESPONDING CATALOG CONTAINING GROUPS OF PAGES

(75) Inventor: Koji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 11/212,671

(22) Filed: Aug. 29, 2005

(65) Prior Publication Data

US 2006/0048043 A1 Mar. 2, 2006

(30) Foreign Application Priority Data

Aug. 30, 2004 (JP) ............................. 2004-250931

(51) Int. Cl.
*G06F 17/21* (2006.01)
(52) U.S. Cl. ..................... 715/234; 715/243; 705/26; 705/27
(58) Field of Classification Search ................ 715/234, 715/200, 229–233, 835–838; 709/203, 219
See application file for complete search history.

(56) References Cited

U.S. PATENT DOCUMENTS

| 6,587,646 | B2 | 7/2003 | Kikuchi et al. ................ 399/8 |
| 6,687,878 | B1* | 2/2004 | Eintracht et al. ............ 715/201 |
| 6,859,909 | B1* | 2/2005 | Lerner et al. ................ 715/203 |
| 6,947,154 | B2 | 9/2005 | Kikuchi ...................... 358/1.1 |
| 2005/0018236 | A1 | 1/2005 | Shirai et al. ................ 358/1.14 |
| 2005/0237543 | A1 | 10/2005 | Kikuchi ...................... 358/1.1 |

FOREIGN PATENT DOCUMENTS

JP 2003-337909 11/2003

\* cited by examiner

*Primary Examiner*—Cesar B Paula
(74) *Attorney, Agent, or Firm*—Fitzpatrick, Cella, Harper & Scinto

(57) ABSTRACT

A document management server, which is capable of transmitting to a client an electronic document in which linked information can be embedded, includes a creation unit which creates an edited document by combining pages selected from the electronic document by the client; an addition unit which adds, to the edited document, linked information containing a destination of the document management server and configuration information representing a configuration of the edited document after reediting; and a transmission unit which transmits, to the client, the edited document to which the linked information is added.

6 Claims, 15 Drawing Sheets

F I G. 3
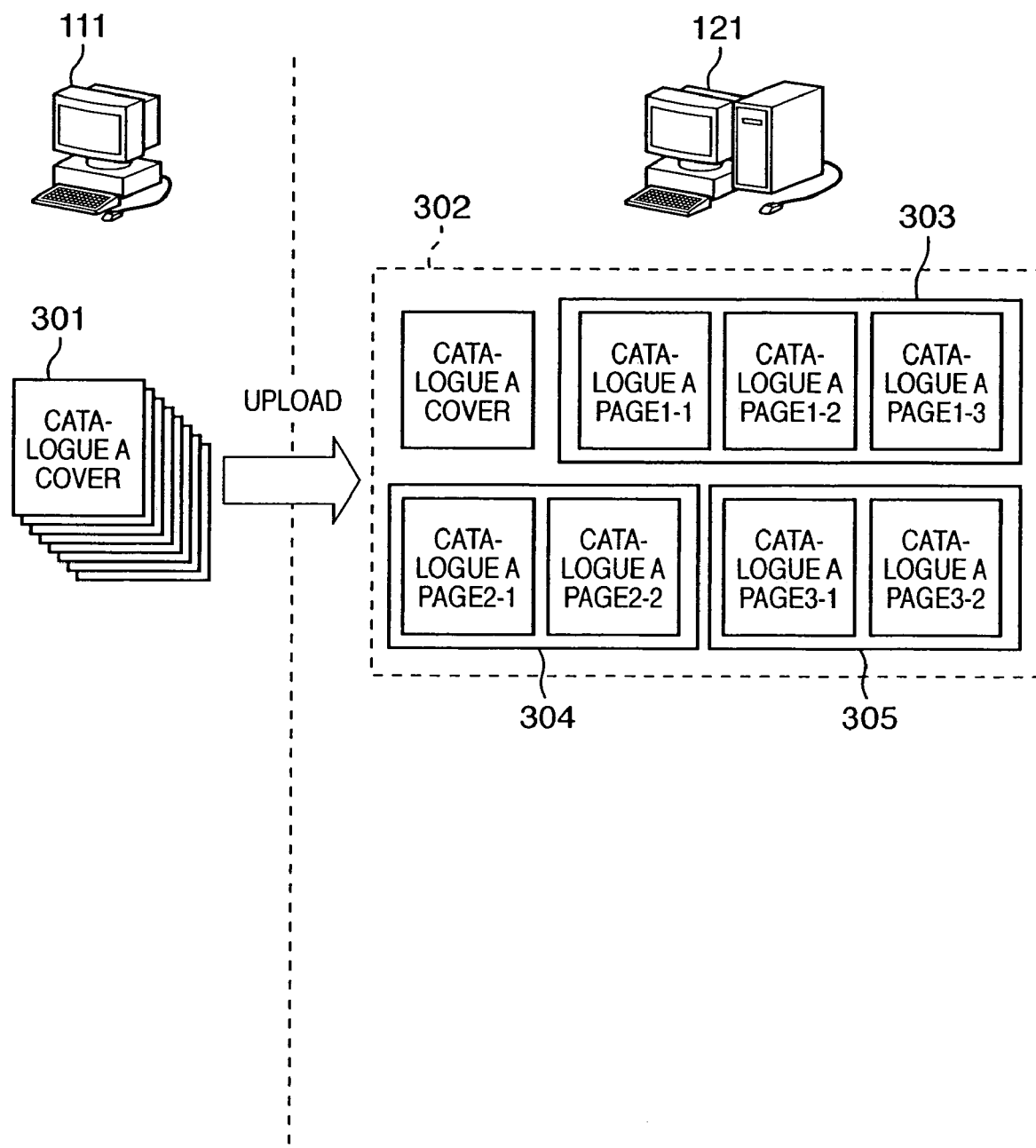

FIG. 6

| COMBINATION | URL NOTATION OF COMBINATION PART |
|---|---|
| "COVER" + "1-1" + "2-1" + "GROUP3" | ACOVER+A1-1+A2-1+AG3 |
| "COVER" + "1-2" + "2-1" + "GROUP3" | ACOVER+A1-2+A2-1+AG3 |
| "COVER" + "1-3" + "2-1" + "GROUP3" | ACOVER+A1-3+A2-1+AG3 |
| "COVER" + "GROUP1" + "2-1" + "3-1" | ACOVER+AG1+A2-1+A3-1 |
| "COVER" + "GROUP1" + "2-1" + "3-2" | ACOVER+AG1+A2-1+A3-2 |

601 / 602

EXAMPLE OF NOTATION OF ALL URLS FOR "COVER" + "1-1" + "2-1" + "GROUP 3"
http://xxxxx.jp/catalogue_management/combine?ACOVER+A1-1+A2-1+AG3

| LABEL | COMBINATION OF GROUPS |
|---|---|
| LABEL1 | "COVER A" + "GROUP 1" + "GROUP 2" + "GROUP 3" |
| LABEL2 | "COVER B" + "GROUP 4" + "GROUP 5" + "PAGE B3" |
| LABEL3 | "GROUP 1" + "GROUP 2" + "GROUP 5" |

FIG. 12

| DOCUMENT NAME | A | | | | |
|---|---|---|---|---|---|
| SELECTED GROUP | 1 | 2 | 3 | | |
| SELECTED PAGE | 1 | 2 | | | |

1201

DOCUMENT SERVER GENERATING LINK INFORMATION FOR CREATING A CORRESPONDING CATALOG CONTAINING GROUPS OF PAGES

FIELD OF THE INVENTION

The present invention relates to a document management server which manages page by page an electronic document (e.g., an electronic catalogue) configured from a structured document uploaded in accordance with an instruction from a client, combines designated pages of the electronic catalogue, and outputs the combined catalogue.

BACKGROUND OF THE INVENTION

There has recently been proposed an electronic catalogue system which creates a desired electronic catalogue by a server in accordance with a request from a client. In this system, a Web server saves, as an electronic catalogue, an electronic file of a structured document (e.g., PDF file) which is uploaded from, e.g., a client. The server manages, as page parts, pages of a document which configures the electronic catalogue. The client designates a combination of arbitrary page parts, and the server creates an electronic catalogue by combining designated page parts into a new electronic document. The new electronic document is output to the client or downloaded by the client (Japanese Patent Laid-Open No. 2003-337909).

A document is made up of pages arranged in order. A structured document such as a PDF document can be configured from one or a plurality of groups each containing one or a plurality of pages. A document containing a group has a hierarchical configuration of an entire document—groups—pages. The entire document can also contain a page which does not belong to any group. There is an electronic catalogue system which configures a structured electronic document in which a plurality of pages are grouped as candidates for one page. In this electronic catalogue system, the user can select each page from each group via a client, creating one catalogue.

When the conventional electronic catalogue system is used, complete static document data is created every time selected pages are combined even if electronic catalogue data which are combined and output from a server in accordance with an instruction from a client appear to be in the process of creation from the user's perspective. For this reason, the conventional electronic catalogue system poses the following problems.

(1) When the user has not finalized selection of a desired one of pages contained in a given group, all choices (i.e., all pages) belonging to the group must be combined. To perform a process of selecting one of choices in a group and combining the selected choice, other pages which have already been selected and currently form a catalogue must be newly reselected. This is because the combined document data is completed even in the process of creation.

(2) A page in which a plurality of pages (each page will be referred to as a reduced page) contained in one group are reduced and laid out may be created in advance and contained in original electronic catalogue data. In this case, even if one reduced page in the group is selected and the selection is finalized, the remaining reduced pages (i.e., unselected reduced pages) laid out on the same page are undesirably contained in the combined document.

(3) To cancel finalized selection of a page and reselect another page, the user must newly reselect and output even a group to which a finalized page belongs.

SUMMARY OF THE INVENTION

The present invention has been made in consideration of the above situation, and has as its object to provide a document management server which increases the operability and process efficiency. According to the document management server, a client need not reselect a page which has been selected from an original electronic document, and a document can be reconfigured from pages selected stepwise. A selected page need not be newly reselected, increasing the operability and process efficiency.

It is another object of the present invention to provide a document management server capable of avoiding creation of a document containing an unselected page. According to the document management server, when a group whose page is not selected is contained in a current edited document, a page containing reduced pages of pages belonging to the group is created. The page is combined with another selected page to create an edited document, and a document is reconfigured from pages selected from the edited document.

It is still another object of the present invention to provide a document management server capable of easily reconfiguring an edited document by creating in advance configuration information representing the configuration of an edited document.

It is still another object of the present invention to provide a document management server which prevents reconfiguration of an edited document identical to an edited document which has already been selected, and thereby prevents waste of a calculation resource.

It is still another object of the present invention to provide a document management server capable of easily canceling selection.

To solve the above problems, the present invention comprises the following arrangement.

A document management server capable of transmitting to a client an electronic document in which linked information can be embedded, comprises creation means for creating an edited document by combining pages selected from the electronic document by the client, addition means for adding, to the edited document, linked information containing a destination of the document management server and configuration information representing a configuration of the edited document after reediting, and transmission means for transmitting, to the client, the edited document to which the linked information is added.

With this arrangement, the client need not reselect a page which has been selected from an original electronic document, and a document can be reconfigured from pages selected stepwise. A selected page need not be newly reselected, increasing the operability and process efficiency.

By reconfiguring a document from selected pages, creation of a document containing an unselected page can be avoided.

By creating in advance configuration information representing the configuration of an edited document, the edited document can be easily reconfigured.

Reconfiguration of an edited document identical to an edited document which has already been selected can be prevented, thereby preventing waste of a calculation resource.

Moreover, selection of a page can be easily canceled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of upload of catalogue data from a client according to the first embodiment of the present invention;

FIG. 6 is a table showing an example of the notation of a URL set for the combined catalogue according to the first embodiment of the present invention;

FIG. 12 is a table showing an example of a selection table referred to in configuring an edited document;

DETAILED DESCRIPTION OF THE PREFERRED EMBODIMENTS

First Embodiment

<System Configuration>

Figure 1:
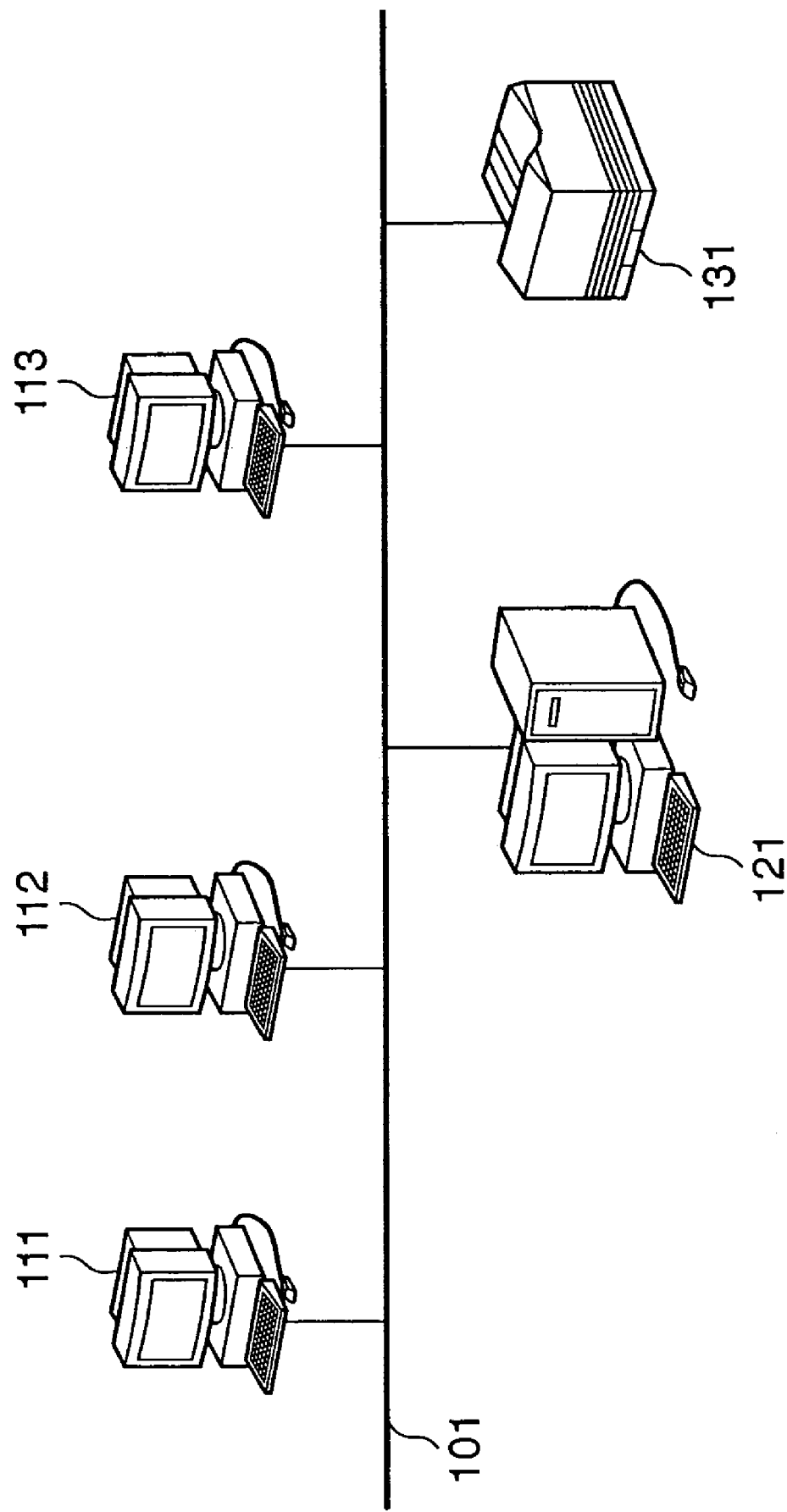
FIG. 1 is a view showing a network configuration according to embodiments of the present invention.

The first embodiment of the present invention will be described below with reference to the accompanying drawings. FIG. 1 is a block diagram showing a network configuration which implements an instruction and/or operation from a client 111 having a Web browser to a catalogue management server 121 in an electronic catalogue management system according to the present invention.

In FIG. 1, the client personal computer 111 and client personal computers 112 and 113 (to be referred to as "client PCs" hereinafter), and the server personal computer (to be referred to as a "server PC" hereinafter) 121 which implements a management system for texts and files in the present invention are connected to a local area network (LAN) 101. A printer 131 is also connected to the LAN 101. The printer 131 is used to print, e.g., a catalogue acquired by a client.

In the first embodiment, the catalogue management server 121 also has a Web server function. Instructions from the Web browsers of the client PCs 111, 112, and 113 are received by the Web server, and processed by a catalogue management server function. The process results are sent back from the Web server to the browsers of the client PCs which have issued the instructions. In the first embodiment, a communication method between the server and the client is not particularly limited. Both of the server and client must support TCP/IP because of a Web system, but any method can be adopted for a layer lower than IP. The browser of the server PC may directly perform an instruction process to the catalogue management system according to the first embodiment. In the first embodiment, the catalogue management server is accessed on the basis of the URL, and a name server for name resolution is also desirably connected to the LAN. This configuration allows constructing the catalogue management system on the Internet instead of the LAN.

The configuration of the client PCs 111, 112, and 113 is not particularly limited as far as they are general PCs which can be connected to the LAN 101 and operate a Web browser. The Web browser of the client can display and print a structured electronic document (e.g., PDF) which configures a catalogue.

Figure 2:
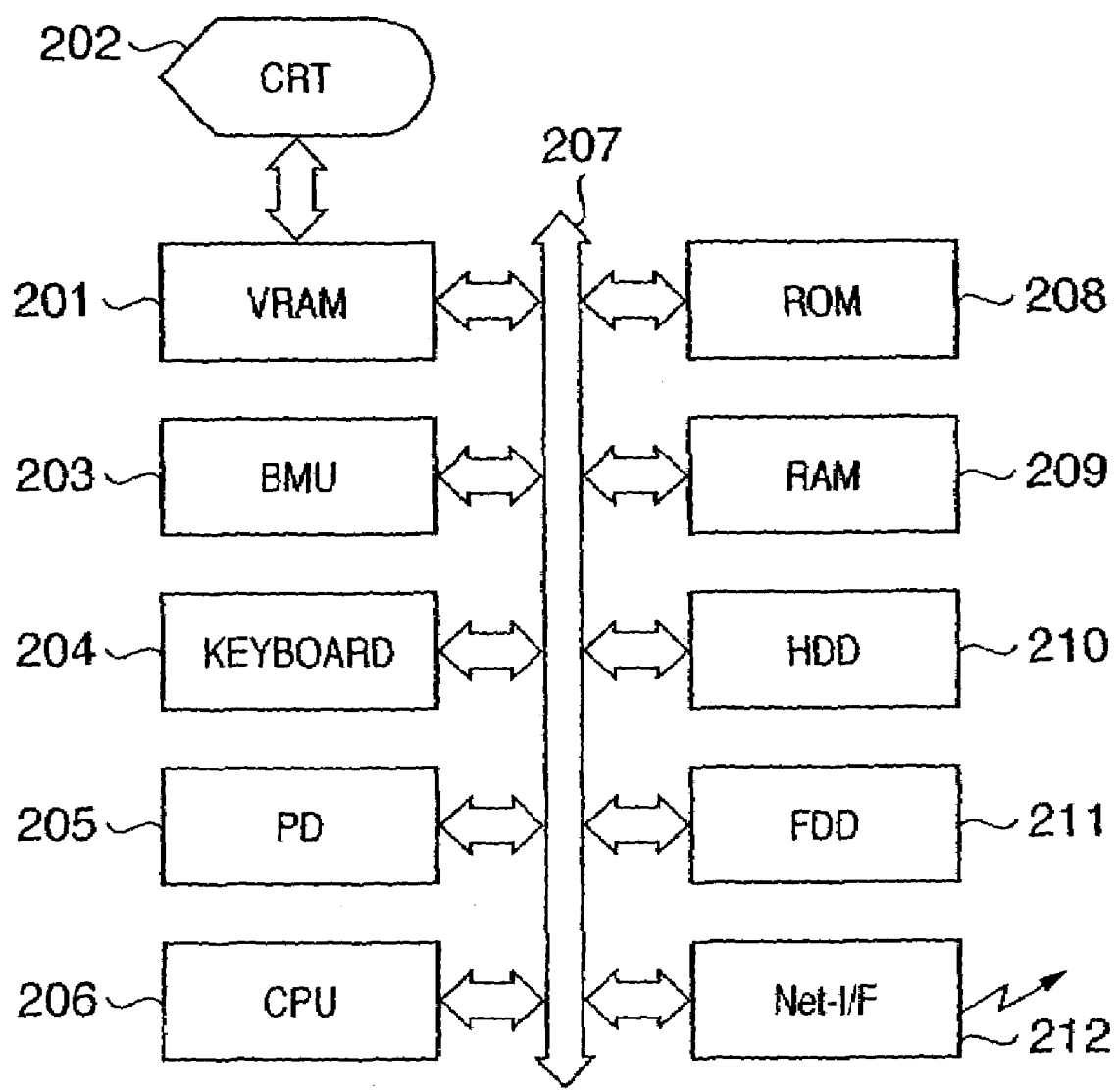
FIG. 2 is a block diagram showing a server PC according to the embodiments of the present invention.

FIG. 2 is a schematic diagram of the configuration of the server PC 121 shown in FIG. 1. In FIG. 2, a video RAM (VRAM) 201 rasterizes and stores a character or image which is to be displayed on the screen of a CRT display device 202. A bit move unit (BMU) 203 controls data transfer between memories or between a memory and a device. A keyboard 204 has various keys for input. A pointing device (PD) 205 is used to point an icon or the like on the screen. A CPU 206 controls respective units of the apparatus on the basis of control programs stored in a ROM 208 (which also stores a program according to the present invention, an error process program, and a program (to be described later) for implementing the present invention). A RAM 209 is used as a work area when the CPU 206 executes each of the above programs, and a temporary save area in an error process. A hard disk drive (HDD) 210 and flexible disk drive (FDD) 211 are used to save an application program, data, database, library, and the like (to be described later). The HDD 210 and FDD 211 are also used to save an uploaded file. A network interface (NET-I/F) 212 controls data transfer, and performs data transfer via a network between the server PC 121 and the client PCs 111, 112, and 113. The network interface 212 also diagnoses data transfer. An I/O bus 207 connects the above-described units, and includes an address bus, data bus, and control bus. Note that the client PC also has the same configuration.

In this configuration, when the apparatus is powered on, the CPU 206 initializes the apparatus in accordance with a boot program in the ROM 208, and loads an OS from the HDD 210. After that, various programs such as sequences shown in FIGS. 7 and 13 run. Since the server apparatus according to the first embodiment is based on a general-purpose information processing apparatus (e.g., personal computer), programs are assumed to be stored in a hard disk or the like. However, programs can also be stored in a ROM. In the first embodiment, a database which stores data, and file management of an electronic catalogue are implemented by one catalogue management server 121. However, the database and file management may also be implemented by different information processing apparatuses, like a database server and file sharing server.

<Description of Catalogue Management System>

The first embodiment which pertains to group management of catalogue pages updated from a client and a combination process for designated catalogue pages in the electronic catalogue management system serving as a basis of the present invention will be described with reference to FIGS. 3 to 6.

FIG. 3 shows an example of group management of uploaded catalogue pages. In FIG. 3, reference numerals 111 and 121 denote a server and client, respectively, according to the first embodiment shown in FIG. 1. The left part of FIG. 3 represents data management by the client, and the right part represents data management by the server.

Catalogue data 301 is original data of catalogue pages used by the client 111 for the combination process of the first embodiment. When the catalogue data 301 is uploaded to the server 121, it is divided into pages (catalogue pages) of a catalogue 302 by the catalog division means of the server 121. The catalogue 302 is a structured document of eight pages. In this example, the uploaded catalogue data 301 is managed by the group management means of the server as the catalogue 302 which is divided into a single start page and three groups (group 1 (303), group 2 (304), and group 3 (305)).

Figure 11:
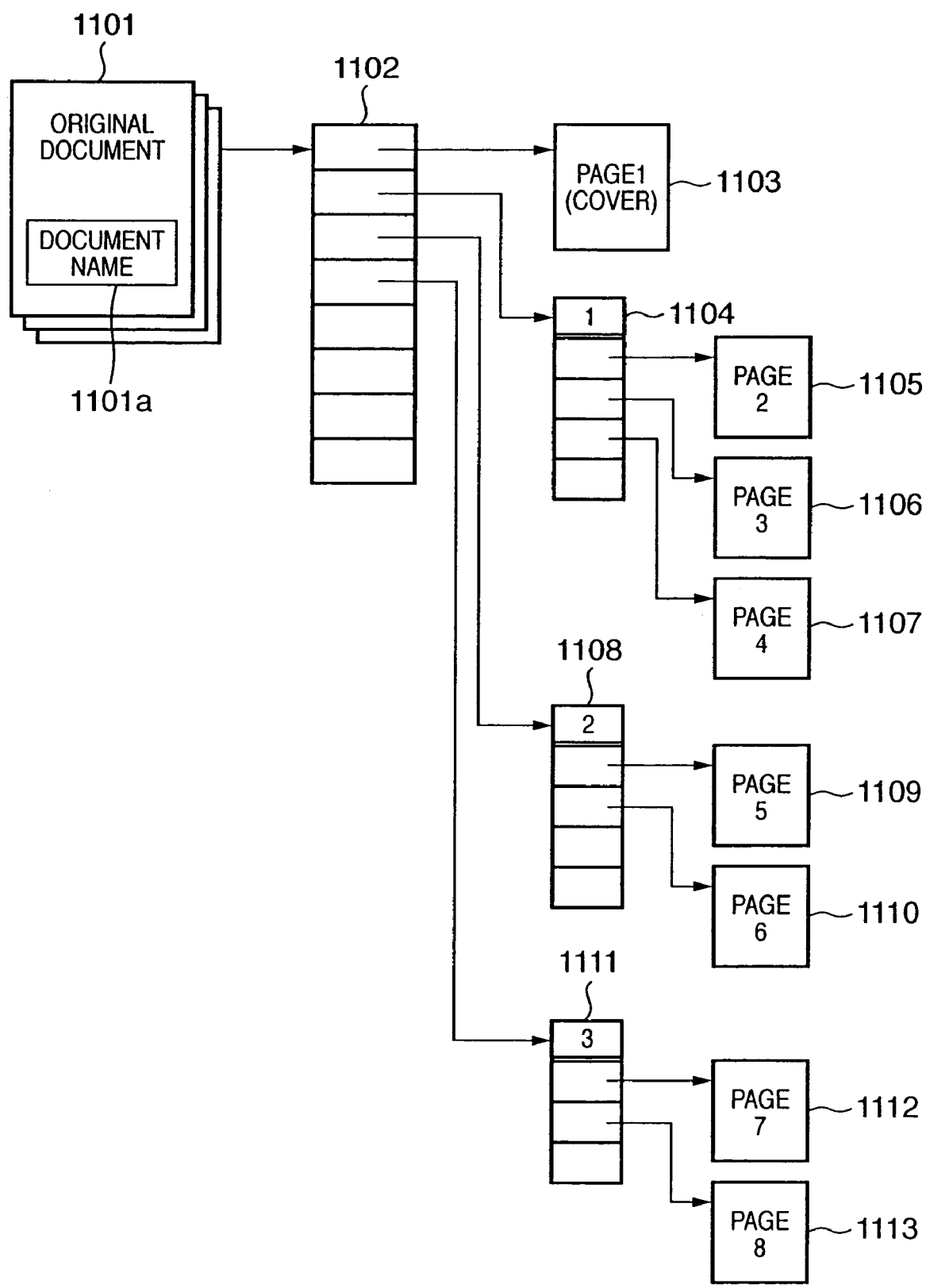
FIG. 11 is a view showing an example of a structured document.

A method of structuring a document can be a known method such that a mechanism is assembled in catalogue data to classify data, pages divided after upload are designated by the user, or files of different formats are simultaneously uploaded. The structuring method is not particularly limited in the first embodiment. FIG. 11 shows an example of this method. In the example of FIG. 11, catalogue data is managed so that its original catalogue (to be also referred to as an original document) 1101 is made to correspond to a structured document (catalogue data). Correspondence is established on the basis of a correspondence table 1102. The original catalogue 1101 is given, e.g., a document name 1101a for identifying a document. The correspondence table makes the original document 1101 correspond to a page 1103 which does not belong to any group, a group 1 management table (1104), a group 2 management table (1108), and a group 3 management table (1111). Page 2 (1105), page 3 (1106), and page 4 (1107) belong to the group 1 management table. Page 5 (1109) and page 6 (1110) belong to the group 2 management table. Page 7 (1112) and page 8 (1113) belong to the group 3 management table. The catalogue management server 121 saves a document file having a hierarchical structure in which pages or groups belong to a document and pages belong to groups. Each drawing (e.g., FIG. 3) representing a catalogue simply illustrates a structure of an entire document—pages or an entire document—groups—pages, as shown in FIG. 11. In the first embodiment, one page is selected from each group to reconfigure a combined catalogue (to be also referred to as an edited document). In the example of FIG. 11, the page 1103 which does not belong to any group is contained in a combined catalogue without especially selecting the page 1103, and one page is selected from each of groups 1 to 3, reconfiguring a combined catalogue of four pages.

The first page of the uploaded catalogue data 302 is managed as a page "catalogue A, cover" which does not belong to any group. The second to fourth pages are grouped into group 1 (303) as "catalogue A, page 1-1", "catalogue A, page 1-2", and "catalogue A, page 1-3". The fifth and sixth pages are grouped into group 2 (304) as "catalogue A, page 2-1" and "catalogue A, page 2-2". The remaining seventh and eighth pages are grouped into group 3 (305) as "catalogue A, page 3-1" and "catalogue A, page 3-2". In this manner, the pages are managed by groups.

In this case, page 1-x belongs to group 1, and is page x which belongs to group 1 and is a choice to be selected in combination. Similarly, page 2-x is page x which belongs to group 2 and is a choice of group 2, and page 3-x is page x which belongs to group 3 and is a choice of group 3.

<Example of Combined Catalogue>

Figure 4:
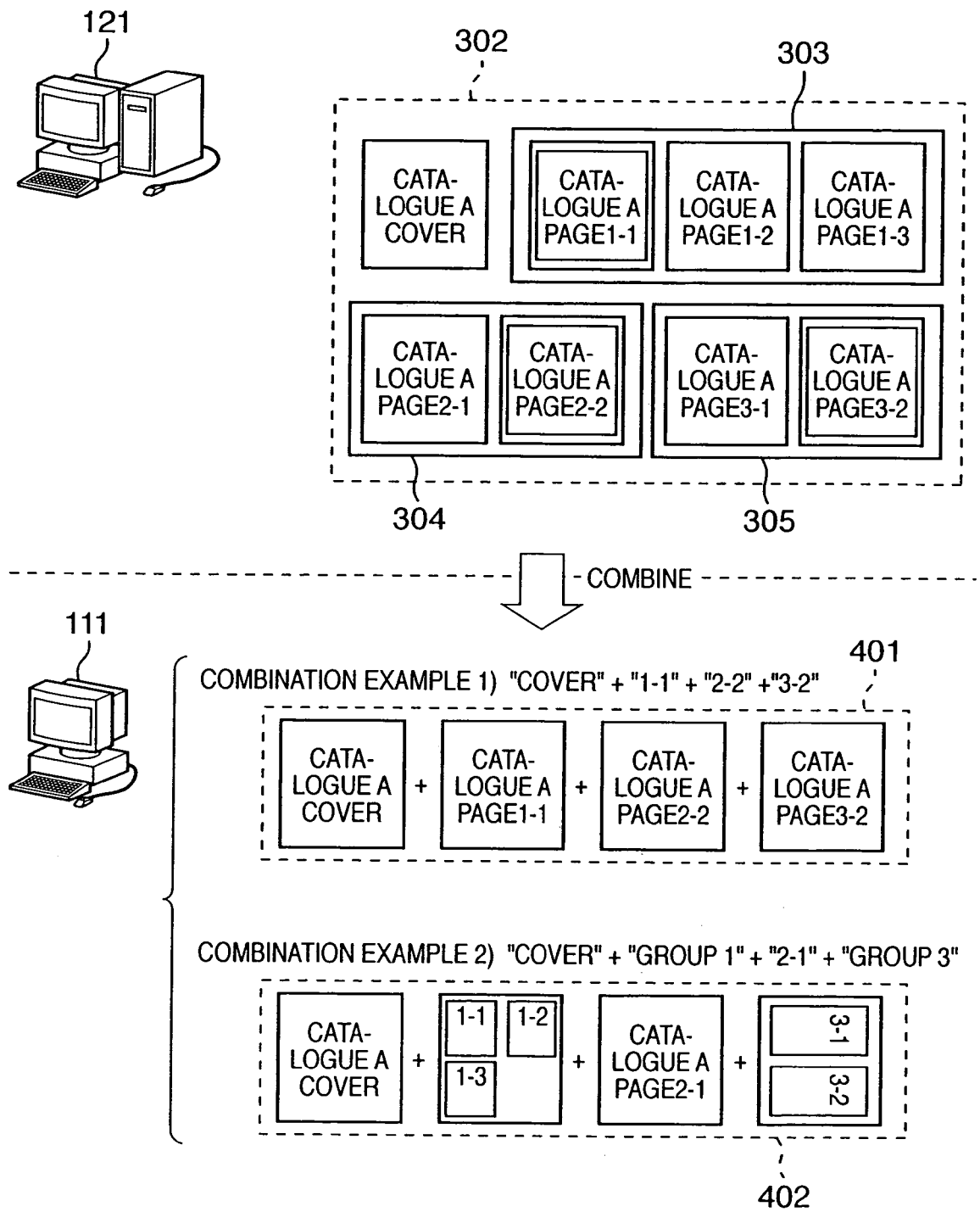
FIG. 4 is a view showing an example of generation of a combined catalogue according to the first embodiment of the present invention.

FIG. 4 shows a combination of a combined catalogue and an example of a reduction layout. Note that a combined catalogue is created by combining pages selected from original catalogue data saved in the catalogue management server, and is also called a reconfigured document. FIG. 4 illustrates an example of a combined catalogue when four pages, i.e., "catalogue A, cover", page 1 of group 1, page 2 of group 2, and page 2 of group 3 are combined from the catalogue data 302 shown in FIG. 3. The upper half in FIG. 4 represents the catalogue data 302 managed by the server 121 shown in FIG. 3. The catalogue data 302 is the same as that in FIG. 3, and a description thereof will be omitted. A double frame shows a page selected for combination example 1. The lower half in FIG. 4 represents an example of a combined catalogue output to the client 111. As combination example 1, "cover", "page 1-1" from group 1, "page 2-2" from group 2, and "page 3-2" from group 3 are selected and designated to be combined in the page layout order. An example of the combined catalogue as an output result is illustrated as combined catalogue 1 (401). As combination example 2, "cover" and "page 2-1" from group 2 are selected in the page layout order. In combination example 2, no catalogue page is selected from groups 1 and 3. An example of the combined catalogue as an output result is illustrated as combined catalogue 2 (402).

In combination example 1, catalogue pages are selected from all the groups, and the selected pages are combined. In combination example 2, no page is selected from groups 1 and 3. Thus, as the second page of combined catalogue 2, all catalogue pages belonging to group 1 are reduced, laid out, and displayed. Similarly, as the fourth page of the combined catalogue, all catalogue pages belonging to group 3 are reduced, laid out, and displayed.

As for the reduction layout, pages can be displayed larger when the number of pages in a group is small, and pages can be displayed smaller when the number of elements is large. The format of the reduction layout may be a landscape 2in1 format (represented by the fourth page of combined catalogue 2) in which two pages of an original size are reduced to fit within one page of the original size, or a 4in1 format (represented by the second page of combined catalogue 2) in which four pages of an original size are reduced to fit within one page of the original size. The format of the reduction layout may also be 9in1 or 16in1. For example, the format is changed in accordance with the number of pages in a group: for example, the 2in1 format is adopted for two pages, the 4in1 format is adopted for four pages or less, the 9in1 format is adopted for nine pages or less, and the 16in1 format is adopted for 16 pages or less.

<Link Information>

Figure 5:
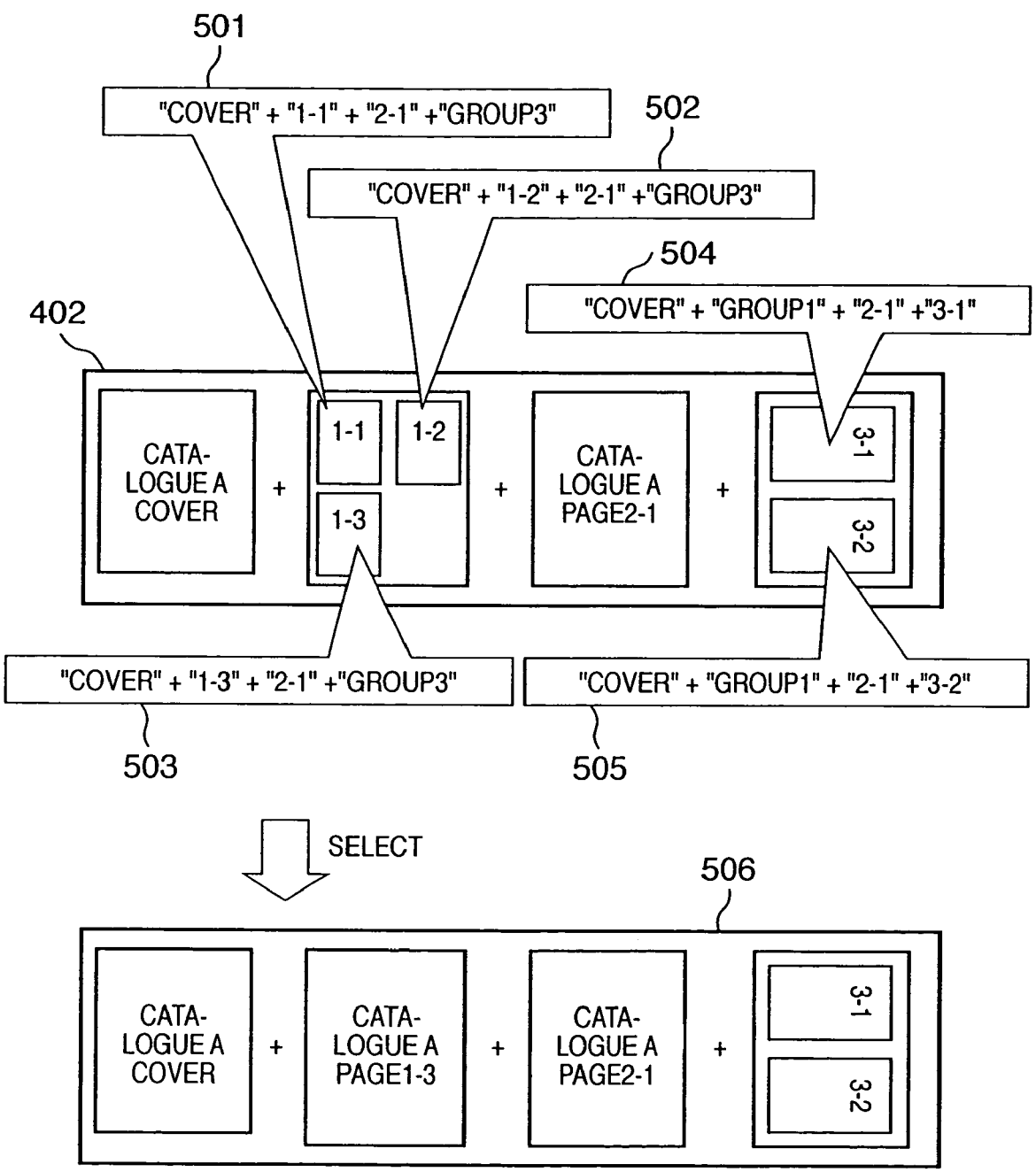
FIG. 5 is a view showing a schematic example of link information set for the combined catalogue according to the first embodiment of the present invention.

Link information representing a combination (i.e., combined catalogue) of pages or groups obtained as a result of the combination process will be explained with reference to FIG. 5. FIG. 5 shows an example when all catalogue pages in each of groups 1 and 3 are inserted into a combined catalogue with a reduction layout because no page is selected from groups 1 and 3. In FIG. 5, the combined catalogue 402 exhibits a page configuration in combined catalogue 2 in the combination example described with reference to FIG. 4. The combined catalogue 402 is also an image displayed in the client. Upon display, pages can also be reduced and displayed, or pages corresponding to an instruction can also be displayed. For illustrative convenience, FIG. 5 shows the whole catalogue.

FIG. 5 illustrates the first, second, third, and fourth pages of the combined catalogue from the left. Since no page is selected from group 1 for the second page of the combined catalogue, three choices (pages) belonging to group 1 are reduced and laid out to form one page. Hence, any of "page 1-1", "page 1-2", and "page 1-3" can be selected from group 1. Link contents 501 to 503 in FIG. 5 are building components of the combined catalogue that can be obtained when each reduced page is selected. Selection of a reduced page is implemented by selecting the symbol or link information of the reduced page from a user interface (shown in FIG. 5 and the like) displayed in the client.

The link content 501 represents a combination of pages and groups when "page 1-1" is selected from group 1 of the combined catalogue 402. "Cover" positioned at the first page and "page 2-1" positioned at the third page are finalized in the combined catalogue 402. "Group 3" positioned at the fourth page is maintained (in the 2in1 layout) because no page is selected in selection from group 1. Selection of "page 1-1" results in an instruction to combine "cover" + "page 1-1" + "page 2-1" + "group 3".

Similarly, the link content 502 represents a combination in which "page 1-2" replaces a reduced/laid-out page corresponding to the second page of the combined catalogue 402. The link content 503 represents a combination in which "page 1-3" replaces a reduced/laid-out page corresponding to the second page of the combined catalogue 402. Link contents 504 and 505 represent combinations in which "page 3-1" and "page 3-2" replace a reduced/laid-out page corresponding to the fourth page of the combined catalogue 402, respectively.

Combined catalogue 3 (506) shows an example of the layout of a combined catalogue created by executing a replacement process (process of replacing group 1 with page 1-3) to the combination given by the link content 503. The combined catalogue 506 has a page configuration in which "page 1-3" replaces the second page of the combined catalogue 402.

When all pages have not been selected and a combined catalogue (to be referred to as an uncompleted combined catalogue) containing a group from which no page is selected is created, like the combined catalogue 402 in FIG. 5, the catalogue management system according to the first embodiment easily, quickly selects a page from the uncompleted combined catalogue. For this purpose, an uncompleted combined catalogue to be transmitted from the catalogue management server 121 to the client is configured as follows. More specifically, each choice, i.e., each reduced page in a group (to be referred to as an unselected page) from which no page is selected is associated with a URL (corresponding to link information) made up of the address (domain name) of the catalogue management server 121 and configuration information representing the configuration of a combined catalogue when the reduced page is selected. The configuration information is defined as information representing a directory or the like following the domain name of the server. When a user who browses an uncompleted catalogue selects a desired reduced page from an unselected page (e.g., by clicking with a pointing device), the client tries to access the catalogue management server at an address corresponding to the domain name contained in the URL associated with the selected reduced page. This process is implemented by, e.g., a Web browser or a plug-in module for a structured document process which is executed in the Web browser.

The accessed catalogue management server 121 determines that the directory name contained in the URL is a predetermined identifier representing configuration information of the catalogue. If the directory name contained in the URL is configuration information of a combined catalogue, the combined catalogue given by the configuration information is reconfigured and transmitted to the client. In this way, the user can select an unselected page stepwise without reselecting a page which has already been selected. FIG. 5 shows an example of a catalogue image displayed in the client. Balloons and the like displayed outside the frame of the combined catalogue 402 only give an explanation, and are not displayed.

An example of the description of link information, i.e., a URL in an actual combining process is shown in FIG. 6. A page has been exemplified in FIG. 5 to explain an example of the combination, whereas an example of an actual URL description for the combination in FIG. 5 is shown in FIG. 6. Reference numerals 501 to 505 in FIG. 5 are used only to explain a combination of pages, and information embedded in a combined catalogue is one as shown in FIG. 6. In FIG. 6, a combination column 601 lists combination examples shown in FIG. 5 for descriptive convenience, and this data is not actually created. A URL notation column 602 on the right side provides examples of URL notations corresponding to the combination column 601.

For example, A is prefixed to each page or group because of catalogue A. That is, a cover corresponding to the first page is notated as "ACOVER"; "1-1" corresponding to the second page, "A1-1"; the third page, "A2-1"; and the fourth page, "AG3" because of group 3. Configuration information of a combined catalogue having a combination ""cover" + "1-1" + "2-1" + "group 3"" on the top in FIG. 6 is given by coupling these components by "+". This configuration information is coupled via "?" to a URL example "http://xxxxx.jp/catalogue_management/combine" for a catalogue combining process in the server 121. In this case, "?" is a command representing that configuration information appears following "?". As a result, a URL corresponding to the combination ""cover" + "1-1" + "2-1" + "group 3"" of catalogue A can be described as "http://xxxxx.jp/catalogue_management/combine?ACOVER+A1-1+A2-1+AG3". This URL is associated with the image of a reduced page "1-1" on the second page of the combined catalogue 402. When the client designates the reduced page "1-1" displayed on the user interface, access to the associated URL occurs to perform a combining process for the catalogue represented by the configuration information. This also applies to another configuration. Linking on a page is possible for a PDF document which is widely used at present.

As described above, a created URL represents an intra-server identifier (e.g., "ACOVER", "A1-1", or "AG3" which is a unique identifier in the catalogue management server) for specifying a page or group in a document by connecting a document name ("A" in FIG. 6) and a page identifier (e.g., "COVER" or "1-1") uniquely representing a page in the document or a group identifier (e.g., "G3") uniquely representing a group. These identifiers are connected by "+" to specify a catalogue to be reconfigured.

<Combined Catalogue Configuring (Combining) Process>

Figure 7:
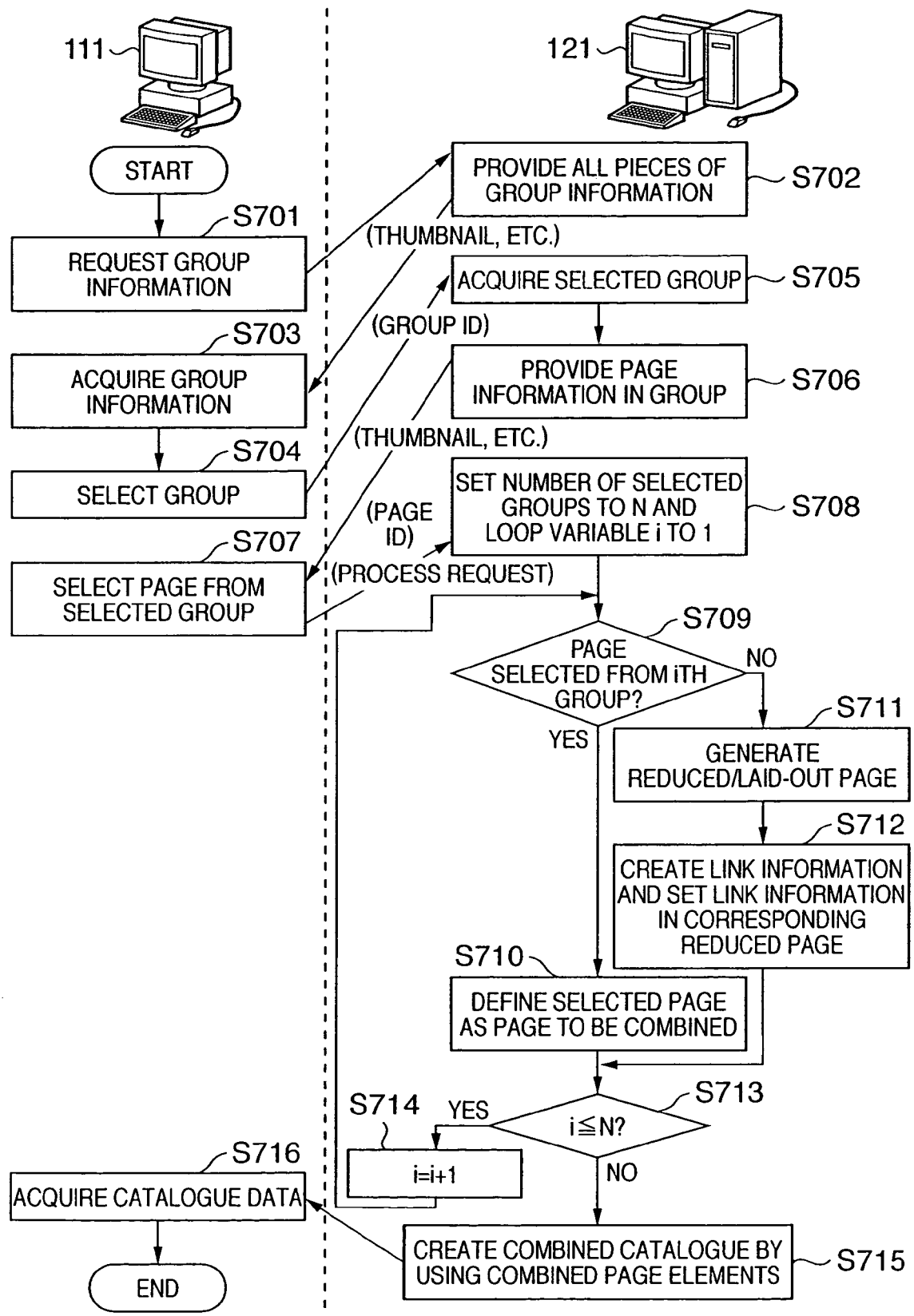
FIG. 7 is a flowchart according to the first embodiment of the present invention.

FIG. 7 is a flowchart showing the above-described combining process. Note that the flowcharts of the upload process and group setting shown in FIG. 5 will be omitted.

In step S701 of FIG. 7, the client 111 requests all pieces of group information managed by the server 121 when designating the combining process. In this step, the client 111 may transmit a document name (catalogue name) to the server 121 together with information representing the request. With this operation, information to be transmitted from the server 121 in step S702 suffices to be information on a group belonging to the designated catalogue.

In step S702, the server 121 provides the client 111 with all pieces of managed group information in response to the request in step S701. If a document name has been designated, only information on a group belonging to the designated document is provided. In this example, information on a single page (e.g., cover page as shown in FIG. 5) belonging to no group is also provided, but a single page may be provided as a single group. The presented group information contains the identifier of each group and information serving as a clue which helps the user of the client select a group. For example, the group information is information which associates an item common to pages in each group or the thumbnail image of pages in each group with the identifier of the group.

In step S703, the client 111 acquires the group information which is provided by the server 121 in step S702 and also contains a single page. In step S704, the client 111 selects groups to be combined from the group information acquired in step S703, and sets the layout order of the groups. Groups are selected from presented groups by, e.g., the user of the client. At this time, single page data not belonging to any group can also be selected. Information on a selected group is, e.g., a group identifier, which is transmitted to the server. In step S705, the server 121 acquires the selected group information from the client.

In step S706, the server 121 provides the client with catalogue page information which has been acquired in step S705 and belongs to the selected group. The provided page information belonging to the group contains the identifier of each page and information serving as a clue which helps the user of the client select a page from the selected group. For example, the page information is information which associates, e.g., the thumbnail image of a page in each group with the identifier of the page for each selected group.

In step S707, the client 111 acquires the catalogue page information provided in step S706. The user selects a page from each group on the basis of the catalogue page information. At this time, the user can select a page, end (finalize) selection of the page, and execute a catalogue configuring process. When execution of the catalogue configuring process is selected while an unfinalized group (unselected page) remains, the client 111 issues a request to generate a combined catalogue, to the server 121 by using the selection as a trigger. Information on a page selected from the selected group is transmitted to the server 121 together with the request to generate a combined catalogue.

Step S708 is the first process of performing an actual combining process by the server 121 upon reception of the combined catalogue generation request from the client 111. In step S708, the document name, group identifier, and page identifier which are selected by the client 111 are registered in a selection table. FIG. 12 shows an example of a selection table 1201. The selection table contains three items: a document name, selected-group identifier, and selected-page identifier in each selected group. In FIG. 12, the document name is an independent item, and a selected page has a correspondence in which the selected page belongs to a selected group on an upper layer. The selection table in FIG. 12 complies with the example in FIG. 5. The document name is "A", selected groups are 1, 2, and 3, a page selected from group 1 is 1 (i.e., page 1-1), a page selected from group 2 is 2 (i.e., page 2-2), and no page is selected from group 3 (i.e., unselected page). A page which does not belong to any group need not be registered in the selection table. In registration, a single page may be registered in the selection table as a provisional group containing the single page, or a page identifier may be registered while the group identifier column is kept blank. When a single page is registered as a provisional group, an identifier which does not coincide with an existing group identifier is used. When no single page is registered, the single page is regarded to have been selected and is subjected to the combining process. A catalogue is created by the combining process on the basis of the selection table.

In step S708, the server 121 sets the number of groups selected by the client to N, and initializes to 1 a loop variable i for looping the process by the number of groups.

In step S709, the server 121 determines on the basis of the selection table whether the client 111 has selected a catalogue page from the ith group. That is, the server 121 determines whether a page which has been selected in correspondence with a selected group has been registered. If a catalogue page has been selected from the group i, the flow advances to step S710; if no page has been selected, to step S711. In this determination, if only single page data exists or only one catalogue page exists in a group, the server 121 determines that the page has been selected, and the flow advances to step S710.

In step S710, the server 121 registers the page (i.e., page registered in the selection table), which has been recognized as a selected page in step S709, as a page to be combined. When the selection table 1201 is utilized in the combining process, no process need be done in step S710.

In step S713, the server 121 determines whether all groups have been processed, i.e., the loop variable i (target group number) is smaller than the number N of selected groups. If an unprocessed group remains (i≦N), the flow advances to step S714. In step S714, the server 121 increments the loop variable i by one, and the flow returns to step S709 in order to process the next group. If the server 121 determines in step S713 that all groups have been processed, the flow advances to step S715.

If the server 121 determines in step S709 that a plurality of pages exist in a group and no page is selected yet, the flow advances to step S711. In step S711, the server 121 generates a combined page (reduced/laid-out page) in which reduced pages prepared by equally reducing all catalogue pages belonging to a target group (group i) are laid out. In step S712, for each reduced page in the reduced/laid-out page created in step S711, the server 121 creates link information representing a combining process when each page is selected. The server 121 embeds the link information in the reduced/laid-out page in association with each reduced page.

The link information is a URL as described in the example shown in FIG. 6. Of a character string which forms the URL, "http://xxxxx.jp/catalogue_management/combine" up to a domain name and an identifier name representing the combining process in the server is held as a character string in a hard disk or the like by the server in advance. A character string following the command "?" is coupled to this character string to synthesize configuration information. The configuration information can be created on the basis of the selection table 1201. In other words, the selection table contains a document name, the identifier of a selected group, and the identifier of a selected page which are necessary for the configuration information. When groups 1 and 3 are unselected groups in the selection table, corresponding configuration information "ACOVER+AG1+A2-1+AG3" is created. This configuration information is connected to a server identifier name which is given in advance and contains the combining process, creating combining process information "http://xxxxx.jp/catalogue_management/combine?ACOVER+AG1+A2-1+AG3" in the current selection state. The created information is saved in the hard disk or the like. This information is a base of the link information. The link information is created by replacing an identifier corresponding to an unselected page in the combining process information with the identifier of a page in a group. For example, for i=1, group 1 is targeted, and link information is created by replacing "AG1" with the identifier of each page in group 1. When pages in group 1 are pages 1, 2, and 3, pieces of configuration information when respective pages in group 1 are selected:

"http://xxxxx.jp/catalogue_-management/combine?A-COVER+A1-1+A2-1+AG3"

"http://xxxxx.jp/catalogue_management/combine?A-COVER+A1-2+A2-1+AG3"

"http://xxxxx.jp/catalogue_management/combine?A-COVER+A1-3+A2-1+AG3"

are created. Each link information is embedded in association with each reduced page in the reduced/laid-out page created in step S711. The configuration of groups in a document and that of pages in each group can be acquired from the contents of the structured document itself shown in FIG. 11. In this manner, the process of setting link information for a reduced/laid-out page is performed, and the flow advances to a loop determination process in step S713.

In step S715 which is a process when the loop is determined in step S713 to have ended, pages selected in the loop process from step S709, or pages to be combined that are generated as reduced/laid-out pages are combined. That is, the structured document shown in FIG. 11 is reconfigured from only selected groups and selected pages.

In step S716, the client acquires the combined catalogue generated by the server in step S715, and then the process ends. In step S716, the client terminal receives the combined catalogue data from the server.

<Recombining (Reconfiguring) Process>

Figure 13:
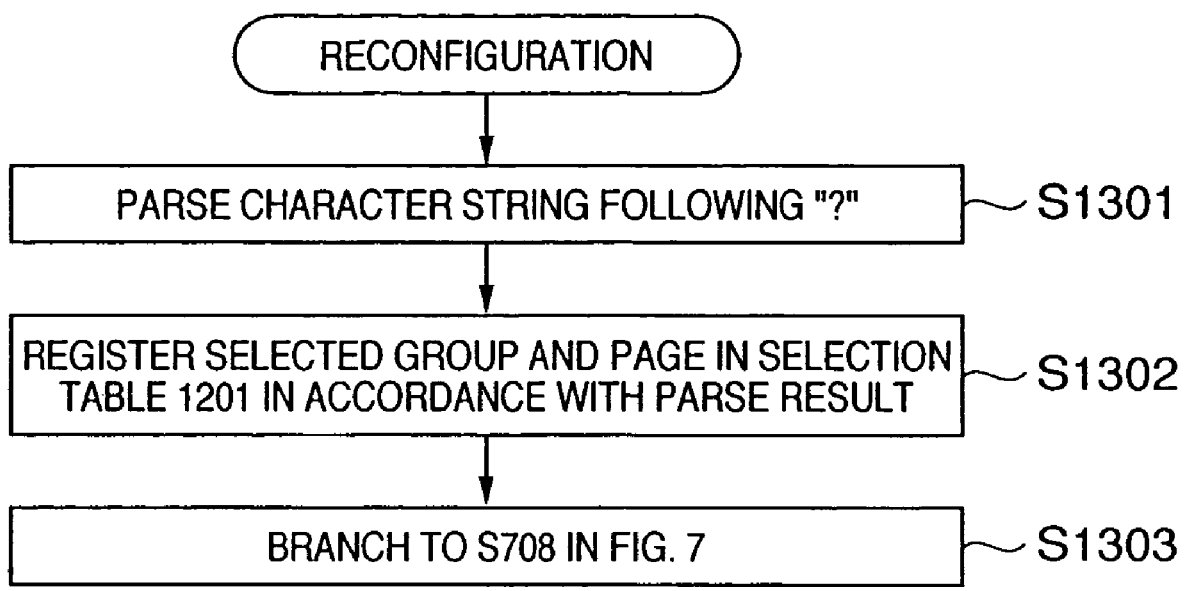
FIG. 13 is a flowchart showing the sequence of a catalogue reconfiguration process by a server accessed on the basis of link information.

FIG. 13 shows a process by the server 121 when the user selects a reduced page in a reduced/laid-out page from a combined catalogue acquired by the client in step S716, and corresponding link information is accessed. The user can access a destination indicated by link information by, e.g., double-clicking a reduced page. This function is called a hypertext which is implemented in the PDF and the like. The destination of link information is determined by the combining process unit of the catalogue management system, and the process in FIG. 13 is a process sequence by the combining process unit.

In step S1301, received configuration information (character string following "?" in a URL) is parsed. In step S1302, a document name, group identifier, and page identifier subjected to the combining process are acquired and reconfigured in the selection table of FIG. 12. The process then branches to step S708 in FIG. 7. Since the selection table has already been created, no selection table configuring process need be performed in step S708. Consequently, a combined catalogue as described in configuration information can be created and acquired by the client.

In the first embodiment, the URL of the combining process that contains page combination information when choices (pages in groups) are selected is set as link information in a combined catalogue. With this setting, the first embodiment can implement an electronic catalogue capable of easily creating a combined catalogue in which an automatically selected page is reflected and/or updated when the link information is selected.

A scenario file which describes a combination of catalogue pages or groups in accordance with the URL notation as shown in FIG. 6 can be prepared in advance in the server. In this case, a URL set as link information of a combined catalogue can be specified by designating the ID of the scenario file. The URL is associated with any part of the combined catalogue, and can be selected by the user. With this setting, the user can easily select a combined catalogue prepared in advance.

When user authentication is necessary for access to the catalogue management server, user information is also added in advance in the catalogue combining process to configuration information of a URL associated with a catalogue. When the catalogue management server is accessed, it can execute user authentication by acquiring the user information contained in the configuration information.

Instead of directly describing a URL in link information, a script may be executed. In this case, URL information is described in the script, user information stored in a security function in the structured document of a combined catalogue is acquired, and the user information is dynamically set by the script for the URL.

Second Embodiment

A method of labeling in advance and managing a group selection process in a catalogue combining process and thereby omitting the process of selecting a group every time the combining process is designated will be explained as the second embodiment.

Figure 8:
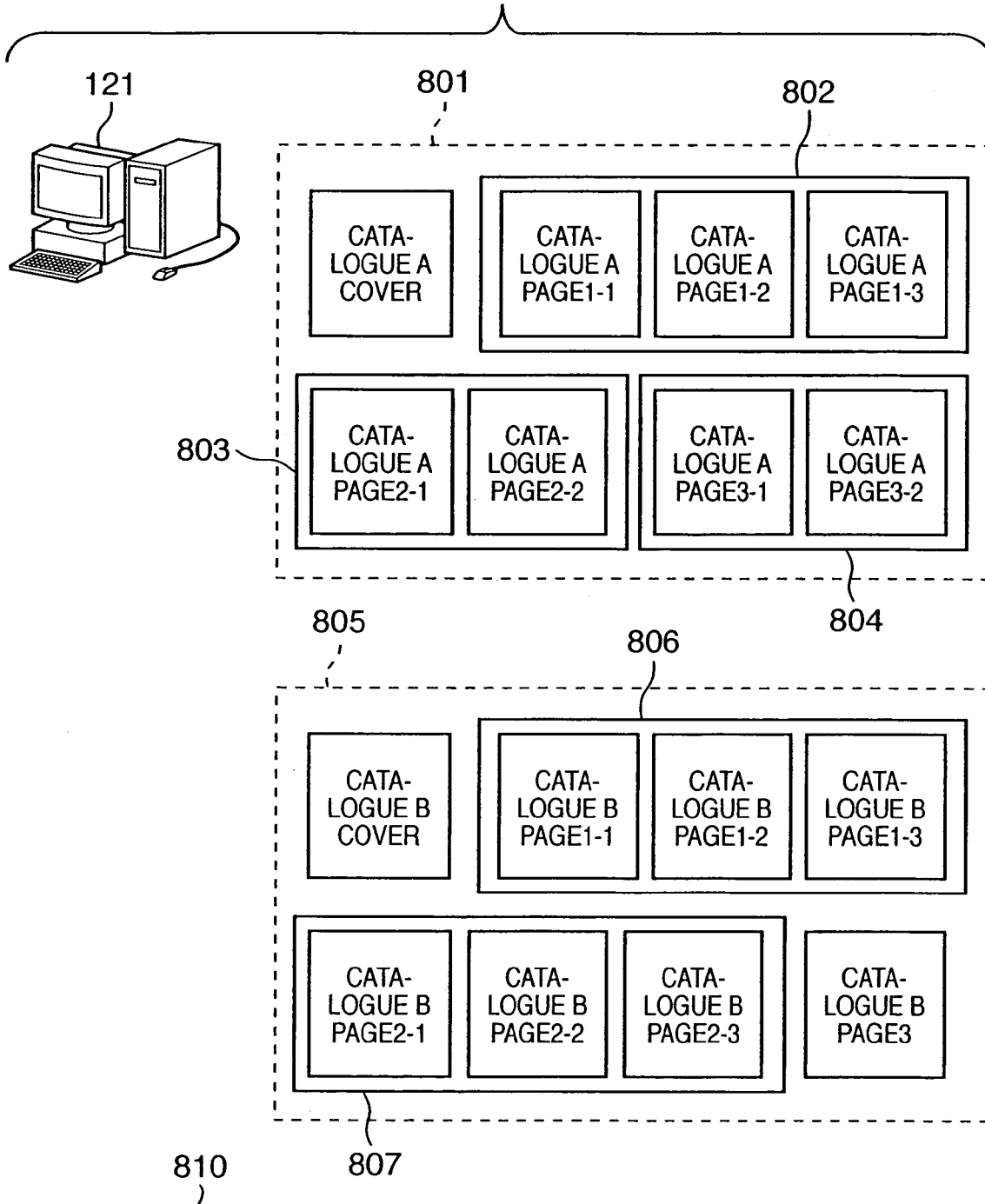
FIG. 8 is a view showing an example of a label management method for a combination according to the second embodiment of the present invention.

FIG. 8 shows an example of a server 121. In FIG. 8, the server 121 has the same configuration as in the first embodiment. Catalogue data A (801) contains a single cover page, group 1 (802), group 2 (803), and group 3 (804). "Page A1-1", "page A1-2", and "page A1-3" are registered in group 1 (802), "page A2-1" and "page A2-2" are registered in group 2 (803), and "page A3-1" and "page A3-2" are registered in group 3 (804). In this representation, catalogues "A" and "B" are prefixed to page notations in order to discriminate these two catalogues. In configuration information, the document names "A" and "B" are prefixed to group identifiers and page identifiers to maintain the uniqueness in the server.

Catalogue data B (805) contains a single cover page, group 4 (806), group 5 (807), and "page B3". "Page B1-1", "page B1-2", and "page B1-3" are registered in group 4 (806), and "page B2-1", "page B2-2", and "page B2-3" are registered in group 5 (807).

A table 810 in FIG. 8 shows an example in which a combination and order of a single page and groups in each of catalogues A and B are set and managed by a label. "Label 1" sets a combination of all groups (including a single page) in catalogue A. "Label 2" sets a combination of all groups in catalogue B. "Label 3" sets a mixed combination of groups in catalogues A and B, and exhibits a combination of "group 1", "group 2", and "group 5". These combinations are described in corresponding configuration information, and held in the server as URLs as shown in FIG. 6. For example, in step S702 of FIG. 7, group information containing buttons at which these URLs are embedded as link information is transmitted to the client. The user selects a button at which a URL corresponding to FIG. 8 is embedded as link information, and the URL is transmitted to the server 121. The subsequent process is the same as that shown in FIG. 13. In this fashion, creation of a combined catalogue can be easily designated by one click without cumbersomely selecting a group in the catalogue.

The second embodiment can implement a system in which a combination of groups including a single page is managed with a label in advance in the server, and the client can select a desired combination of groups by only designating a label.

Third Embodiment

A method of setting an upper limit value for the number of catalogue pages to be reduced and laid out when no catalogue page in a group is selected, and thereby preventing the reduction layout from becoming excessively small and unreadable will be described as the third embodiment.

Figure 9:
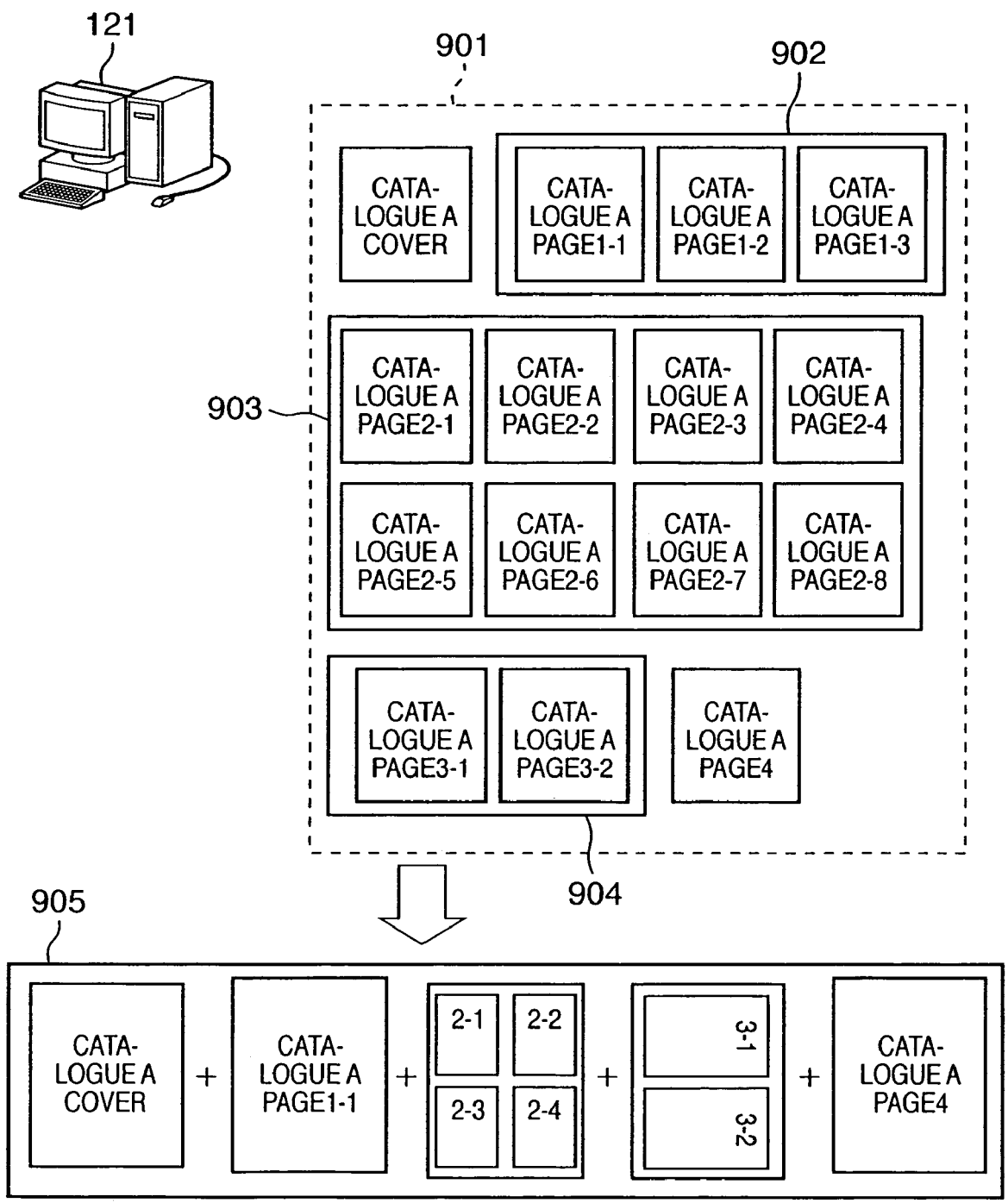
FIG. 9 is a view showing an example of setting the upper limit of a reduction layout according to the third embodiment of the present invention.

FIG. 9 shows an example of a group of catalogue data in a server 121 according to the third embodiment. In FIG. 9, catalogue data A 901 is managed by the server 121. Three catalogue pages serving as choices are registered in group 1 (902). Eight catalogue pages serving as choices are registered in group 2 (903). Similarly, group 3 (904) has choices of two pages.

Group 2 has choices of eight pages. When all the pages are reduced and laid out, the layout becomes 8in1, and the contents of each page may not be recognized. To prevent this, an upper limit value is set for the number of pages to be reduced and laid out, and display priority is set in each group. With this setting, only catalogue pages which are picked up in the order of descending priority in accordance with the upper limit value are reduced and laid out. In an example of a combined catalogue 905 on the lower side of FIG. 9, the upper limit value for the number of pages to be reduced is set to 4 (4in1), and the priority is set as the sub-number of a page. The priority may be permanently decided commonly to, e.g., all documents or groups. For example, the priority can be decided such that four pages are picked up sequentially from the start. Although the priority may be set for each document or each group, information representing the priorities of pages in each document or each group is desirably added to document data in FIG. 11.

FIG. 9 exhibits that a page corresponding to the third page of the combined catalogue 905 has the 4in1 layout, and "2-1", "2-2", "2-3", and "2-4" are reduced and laid out. Note that the upper limit value may be set for each group. Alternatively, a plurality of priority types such as "alphabetical order" and "date order" may be given to cause the client to select one of them. Also, link information for causing the client to select an order may be set at part of a reduced/laid-out page.

The third embodiment can implement a system in which when catalogue pages in a group are to be reduced and laid out, the number of pages can be limited by setting an upper limit value, and catalogue pages desired by the user can be provided as pages in an easy-to-see reduction layout by setting priority for each group.

Fourth Embodiment

The fourth embodiment will describe a method of, assuming that merchandise for sale is included on a catalogue page belonging to each group, when the catalogue page is selected, implementing inventory control and reservation control of the merchandise.

Figure 10:
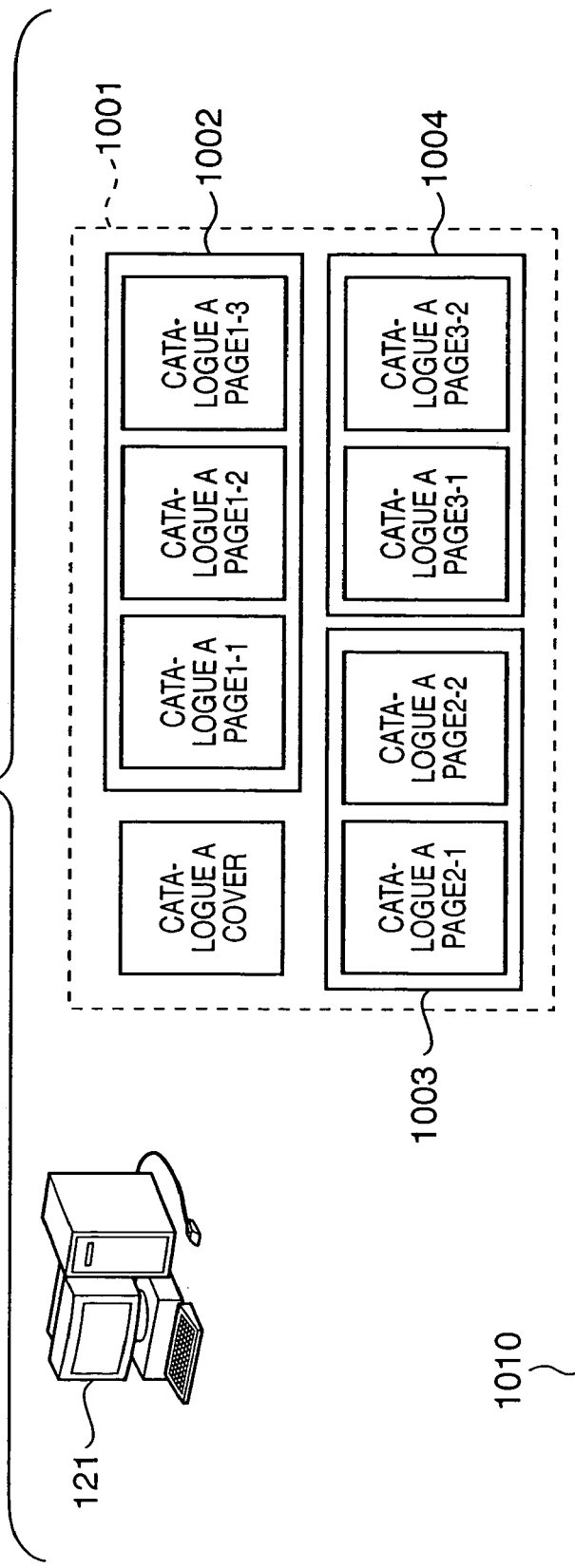
FIG. 10 is a view showing an example of a method of cooperating preservation control and inventory control according to the fourth embodiment of the present invention.

FIG. 10 shows the method according to the fourth embodiment. In FIG. 10, catalogue data (document data) A 1001 is managed by a server 121. Catalogue pages "page 1-1", "page 1-2", and "page 1-3" belong to group 1 (1002). "Page 2-1" and "page 2-2" belong to group 2 (1003). Similarly, group 3 (1004) has "page 3-1" and "page 3-2".

A table having items "catalogue name", "group", "pages in a group", "selection count of a page", "inventory of merchandise", and "combined catalogue ID", like a table 1010, is created for the catalogue data 1001. As the selection count, the number by which a page is selected and combined as a single page to a combined catalogue is counted. At the same time, the combined catalogue ID records the ID of a combined catalogue to which a combining process is designated. As the combined catalogue ID, a sequential number is issued and embedded in a combining URL in the combining process. The server 121 can grasp which page has been selected from the combined catalogue, and can also implement a function of preventing issuing of a repetitive combining instruction to the same catalogue page with the same catalogue ID.

For example, a cover, "page 1-2", and "page 2-1" are selected for a combined catalogue of an ID "1", and no page is selected from group 3 yet. Hence, a page can be selected from only group 3 for the combined catalogue of the ID "1". If no page is selected from group 1 in a previous-generation catalogue of the ID "1", but "page 1-2" has already been selected in the latest-generation catalogue of the ID "1", selection from group 1 can be prevented. In order to prevent a combined catalogue which has already been created from being created by a combining process again, for example, the following process is done. More specifically, upon reception of configuration information, the server 121 starts the process in accordance with the sequence of FIG. 13. Immediately after step S1302, a created selection table and the table 1010 in FIG. 10 are collated with each other. In this case, the table 1010 is searched for groups and pages which are registered in the created selection table, and the item "combined catalogue ID" is referred to. It is determined whether there is an ID which coincides with the ID (which is contained in link information and has been received by the server together with configuration information) of a combining process concerning creation of the configuration information. If a coincident ID is found for all pages or groups, the combined catalogue has already been created. The client is notified that the combined catalogue has already been created, and then the process ends. If no coincident ID is found for all pages or groups, the process branches to step S708 in FIG. 7. Accordingly, a repetitive process and waste of the resource can be prevented.

Figure 14:
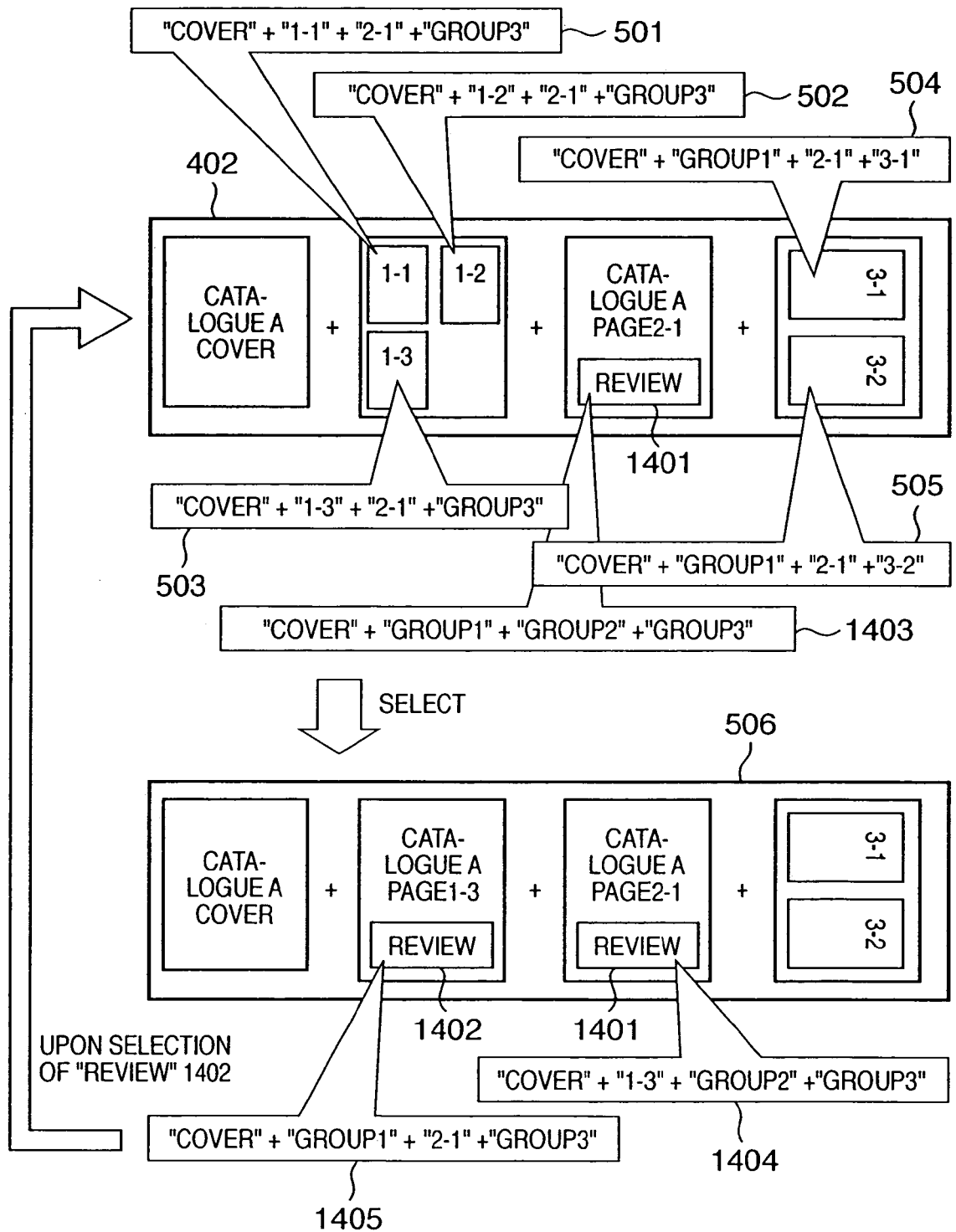
FIG. 14 is a view showing a schematic example of link information set for a combined catalogue according to the fourth embodiment of the present invention.

In order to implement a function of reviewing a group which has already been selected, a function of setting "review" link information in a finalized page is provided. With this function, when a "review" link is designated, a combined catalogue can be updated (i.e., returned) by replacing a catalogue page belonging to a target group with a reduced/laid-out page. As shown in FIG. 14, review link information can be implemented by, for example, saving the logs (1403, 1404, and 1405) of configuration information in which unselected groups remain, and providing the client with the logs as link information (URL) associated with selected pages. For example, in FIG. 14, a review button 1401 is provided at a proper position on selected page 2-1, and configuration information obtained by reducing and laying out group 2 to which page 2-1 belongs is associated as link information with the review button 1401. An example of the link information is "http://xxxxx.jp/catalogue_management/combine?ACOVER+AG 1+AG2+AG3". This URL corresponds to the link content 1403 in review in FIG. 14. If review of page 2-1 on a combined catalogue window displayed in the client is designated, access to "http://xxxxx.jp/catalogue_management/combine?ACOVER+AG 1+AG2+AG3" occurs. In this URL, the domain name represents the catalogue management server 121. Reconfiguration information exhibits a catalogue which is prepared by replacing page 2-1 with its group, i.e., is configured from only unselected groups. Note that association with the review button may be changed to association with the image of a selected page, instead of the review button. In this case, no selection button need be set, and no operation failure occurs because no more item need be selected for the selected page.

Figure 15:
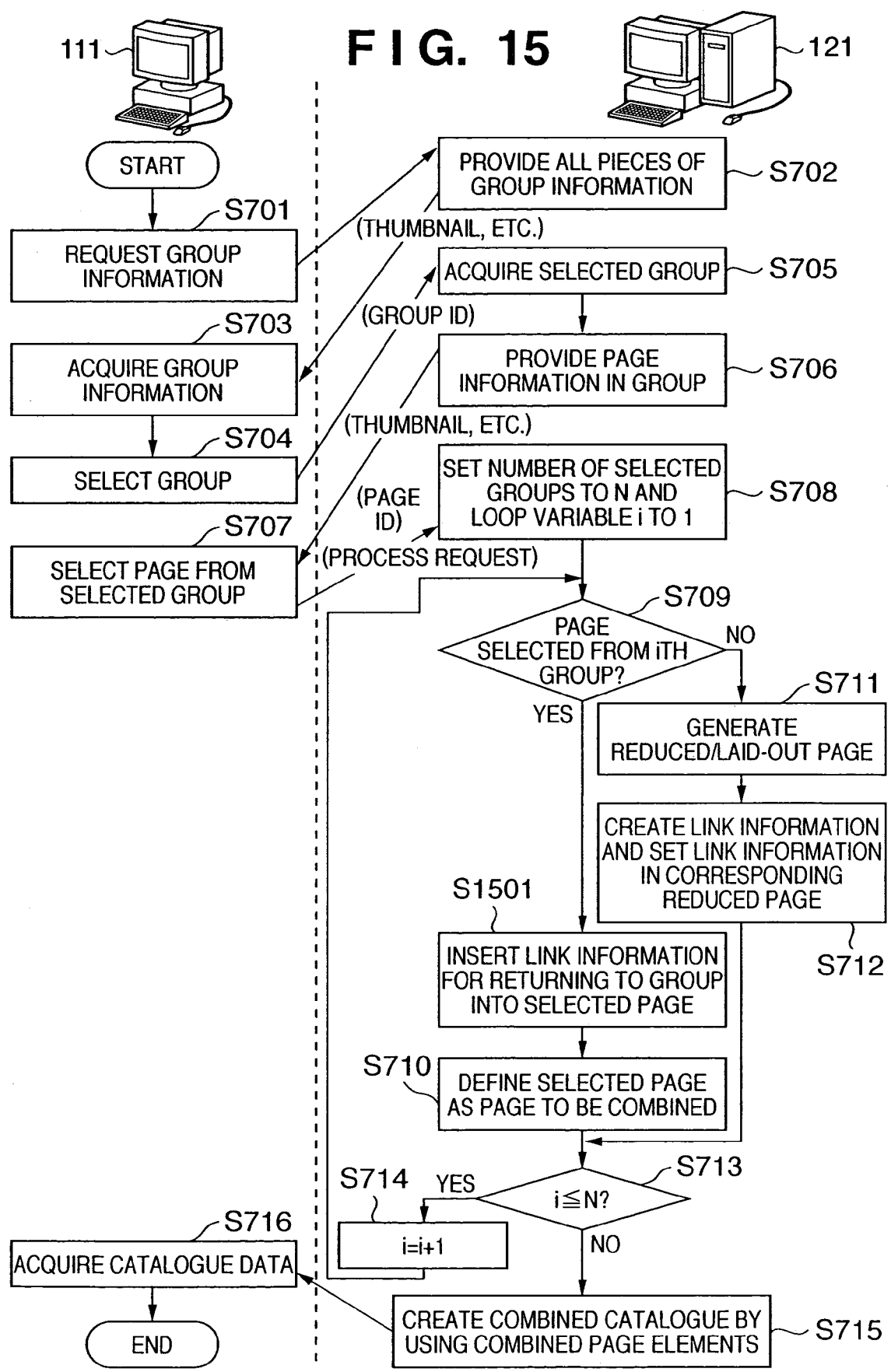
FIG. 15 is a flowchart according to the fourth embodiment of the present invention.

This sequence can be achieved by adding the process in step S1501 to the process in FIG. 7, as shown in FIG. 15. That is, as for a selected page, link information (URL) for returning to a group is embedded in association with the selected page in step S1501.

The accessed catalogue management server 121 executes the process in accordance with the same sequence as that in FIG. 13. In the fourth embodiment, unlike the first embodiment, the process branches not to step S708 in FIG. 7 but to step S708 in FIG. 15. More specifically, received configuration information (character string following "?" in a URL) is parsed in step S1301. In step S1302, a document name, group identifier, and page identifier subjected to the combining process are acquired and reconfigured in the selection table of FIG. 12. The process then branches to step S708 in FIG. 15. Since the selection table has already been created, no selection table configuring process need be performed in step S708 of FIG. 15. As a result, a combined catalogue as described in configuration information can be created and acquired by the client. At this time, step S1501 is also executed as needed, and link information for review is embedded in catalogue information.

Access to associated link information occurs by, e.g., clicking and selecting the review button or the image of a selected page by the user on image information displayed in the client.

By canceling even selected information in the table 1010, switching between a group and a selected page can be realized without generating any error in preservation control and inventory control.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-250931 filed on Aug. 30, 2004, which is hereby incorporated by reference herein.

What is claimed is:

1. A document management server, comprising:
  a storage unit configured to store document data including a predefined page and a plurality of groups of pages;
  a first generation unit configured to generate first combined document data including the predefined page and the plurality of groups of pages, wherein each page of the plurality of groups includes link information for displaying, if a corresponding page of a group is selected, the corresponding page, the predefined page, and one or more pages of one or more groups of the plurality of groups other than the group of the corresponding page; and
  a second generation unit configured to generate, if a page of a group is selected, second combined document data including the selected page, the predefined page, and one or more pages of one or more groups of the plurality of groups other than the group of the selected page, based on the link information corresponding to the selected page in the first document data.

2. The server according to claim 1, wherein at least one of: the first combined document data and the second combined document data includes catalog document data.

3. A document management method performed by a document management server including a storage unit, the method comprising:

storing, in the storage unit, document data including a predefined page and a plurality of groups of pages;

generating first combined document data including the predefined page and the plurality of groups of pages, wherein each page of the plurality of groups includes link information for displaying, if a corresponding page of a group is selected, the corresponding page, the predefined page, and one or more pages of one or more groups of the plurality of groups other than the group of the corresponding page;

generating, if a page of a group is selected, second combined document data including the selected page, the predefined page, and one or more pages of one or more groups of the plurality of groups other than the group of the selected page, based on the link information corresponding to the selected page in the first document data, and providing display data for displaying at least one of: the first combined document data and the second combined document data.

4. The method according to claim 3, wherein at least one of: the first combined document data and the second combined document data includes catalog document data.

5. A computer-readable medium having a computer-executable program stored therein for causing a computer to execute a document management method, wherein the computer includes a storage unit, the method comprising:

generating first combined document data including the predefined page and the plurality of groups of pages, wherein each page of the plurality of groups includes link information for displaying, if a corresponding page of a group is selected, the corresponding page, the predefined page, and one or more pages of one or more groups of the plurality of groups other than the group of the corresponding page;

generating, if a page of a group is selected, second combined document data including the selected page, the predefined page, and one or more pages of one or more groups of the plurality of groups other than the group of the selected page, based on the link information corresponding to the selected page in the first document data, and providing display data for displaying at least one of: the first combined document data and the second combined document data.

6. The medium according to claim 5, wherein at least one of: the first combined document data and the second combined document data includes catalog document data.

* * * * *